United States Patent Office 3,313,119
Patented Apr. 11, 1967

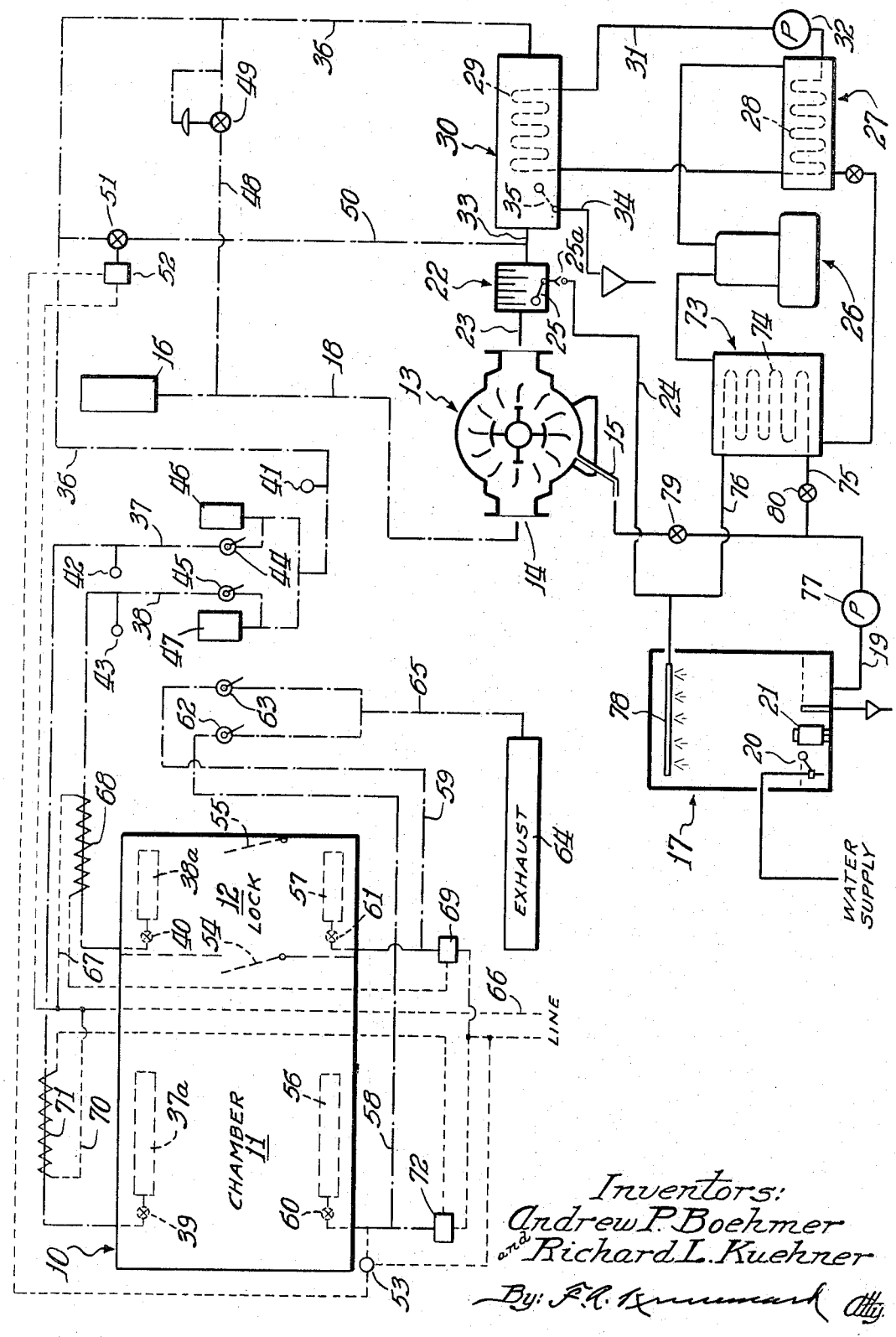

3,313,119
AIR TREATING SYSTEM FOR ENCLOSURES TO IMPROVE ENVIRONMENTAL CONDITIONS
Andrew P. Boehmer, Barrington, and Richard L. Kuehner, Mount Prospect, Ill., assignors to Borg-Warner Corporation, Chicago, Ill., a corporation of Illinois
Continuation of application Ser. No. 463,212, June 11, 1965. This application May 27, 1966, Ser. No. 554,289
11 Claims. (Cl. 62—186)

This application is a continuation of our earlier filed patent application, Ser. No. 463,212, now abandoned, filed June 11, 1965, entitled, "Air Treating System for Enclosures to Improve Environmental Conditions."

The present invention relates to an air treatment system for enclosures to improve environmental conditions and more particularly to such a system for pressure chambers especially adapted for use in medical techniques involving a process known as hyperbaric oxygenation. Chambers of this type are currently known as hyperbaric chambers.

Hyperbaric chambers generally comprises chambers for therapeutic use and house patients which are attended by medical personnel. These chambers comprise a main chamber and an air lock section and are air conditioned in the general sense. There is a constant input of fresh air such that a high rate of air change per hour occurs.

The pressure in these chambers are held at variable levels as conditions demand which calls for extensive piping, valves, controls, etc.

The air lock section serves as a means for ingress and egress and comprises a compartment as an integral part of the chamber with a door therebetween and an exit door to the outside.

Since hyperbaric chambers are designed for therapeutic use it is highly important that the air provided is free from impurities. Accordingly the present invention comprises means for subjecting the air to chemical treatment of a germicidal nature, before delivery to the chamber.

It is therefore an important object of the present invention to provide an improved system of air purification for pressure chambers.

It is a particularly important object of the present invention to provide an improved system of air purification for pressure chambers which comprises subjecting the air to be delivered to the chamber, to germicidal treatment.

The present invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

The sole figure is a diagrammatic representation of an air treatment system for pressure chambers according to the present invention.

Referring now to the sole drawing, a block diagram of a pressure chamber 10 is shown which comprises a main chamber 11 and an air lock section 12.

A water sealed compressor 13 serving to supply air to the pressure chamber 10, is provided with an air intake port 14 and a water intake port 15 which are connected to an air intake silencer 16 and a reservoir 17, respectively by a conduit 18 and a pipe 19 respectively.

The reservoir 17 is connected to a source of water supply and is provided with a float valve 20, for maintaining a predetermined water level and is also provided with a chemical dispenser 21 for treating the water in the reservoir 17.

The exhaust side of the water sealed compressor 13, is connected to a separator 22 by a conduit 23. The separator 22 serves to collect the water that has been exhausted with the air from the water sealed compressor and return it to the reservoir 17 by means of a drain pipe 24 controlled by a float valve 25 and a check valve 25a.

An air conditioning means 26 is provided with an evaporator 27 having a fluid coil 28 connected to a fluid coil 29 within a dehumidifying chamber 30 by a pipe 31 provided with a pump 32 for circulating fluid in the fluid coils 28 and 29.

The separator 22 is connected to the dehumidifying chamber 30 by a conduit 33 whereby moisture saturated air delivered to the dehumidifying chamber 30, condenses the moisture due to the cooling effect of the fluid coil 29. The water collected by condensation is drained from the dehumidifying chamber 30 by a drain pipe 34. A float valve 35 is provided at entrance to the drain pipe 34, which is self-explanatory.

The air which has then been dehumidified passes into a conduit 36 which interconnects the dehumidifier with conduits 37 and 38 which extend into the main chamber 11 and the air lock section 14, respectively, and are provided with air intake silencers 37a and 38a, respectively, and shut-off valves 39 and 40, respectively.

The conduits 36, 37 and 38 are provided with gauges 41, 42 and 43, respectively and conduits 37 and 38 are also provided with manual regulators 44 and 45, respectively.

A conduit 48 provided with a control valve 49 for regulating the pressure in the pressure chamber 10, interconnects the conduits 18 and 36. A conduit 50 interconnects the conduits 33 and 36 and is provided with a control valve 51 which is operably connected to a solenoid 52 connected with respect to a humidistat 53 thereby controlling the humidity in the pressure chamber 10 for the reason that the moisture saturated air in conduit 50 is controlled in volume by the control valve 51 before entering the conduit 36.

A door 54 serves as communicable means between the main chamber 11 and the air lock section 12 which is provided with a door 55 serving as a means for ingress and egress for the pressure chamber 10.

Air exhaust silencers 56 and 57 for the air exhausted from the main chamber 11 and the air lock section 12, respectively, are connected to conduits 58 and 59, respectively, which are provided with shut-off valves 60 and 61, respectively, and manual regulators 62 and 63, respectively.

An exhaust silencer 64 is connected to the conduits 58 and 59 by a conduit 65.

A circuit 66 transmits current to the solenoid valve 52 and the humidistat 53 for their operation.

A circuit 67 transmits current to a heating element 68 for heating the air in the conduit 38 which supplies air therefrom to the air lock section 12, and also transmits current to a thermostat 69 which regulates the temperature in the air lock section 12.

A circuit 70 transmits current to a heating element 71 for heating the air in the conduit 37 which supplies air therefrom to the main chamber 11 and also transmits current to a thermostat 72 which regulates the temperature in the main chamber 11.

The foregoing designates, primarily, the components and their relationship which provides controlled pressure, temperature and humidity in the pressure chamber 10.

Referring now, more specifically with regard to air treatment, the air conditioning means 26 is provided with a condenser 73 which comprises a fluid coil 74 that is connected at opposite ends thereof to inlet and outlet pipes 75 and 76 respectively, which in turn are connected to pipes 19 and 24, respectively.

The pipe 19 is provided with a pump 77 which delivers chemically treated water from the reservoir 17 to the water sealed compressor 13 and to a spray nozzle 78 by way of the inlet pipe 75, the fluid coil 74, the outlet pipe 76 and the drain pipe 24. The temperature of the chemically treated water on passing through the fluid coil 74 of the condenser 73 is increased, but is reduced when returned to the reservoir 17 by the cooling effect of the spray nozzle 78. Control valves 79 and 80 are provided for pipe 19 and inlet pipe 75 respectively for use in regulating the volume of the chemically treated water delivered to (1) the water sealed compressor 13, and (2) into the fluid coil 74, respectively.

In the process of air treatment according to the present invention, the chemical dispenser 21 is provided with a chemical, such as permanganate, which is dispensed in the water contained in the reservoir 17. The water thus treated is passed on to the water sealed compressor 13 where it mixes with the air which results in a purification and/or germacidal treatment of the air, depending on the chemical used.

The mixture of water and air thus treated is exhausted from the water sealed compressor 13 into the separator 22 by way of conduit 23 where the water is separated from the chemically treated air which is passed on to the pressure chamber 10 as heretofore explained, and the water thus separated from the treated air is returned to the reservoir 17 by way of drain pipe 24, thus salvaging the chemically treated water for re-use.

It should be noted that the check valve 25a prevents the chemically treated water from passing back into the separator 22.

On the basis of the preceding information it is apparent that the air provided for the pressure chamber 10, according to the present invention is thoroughly washed and chemically treated as a result of its turbulent contact with the water in the water sealed compressor 13 in the course of its delivery to the pressure chamber 10.

While the present invention has been described in connection with a certain specific embodiment thereof, it is to be understood that this is by way of illustration and not by way of limitation and the scope of this invention is defined solely by the appended claims which should be construed as broadly as the prior art will permit.

We claim:

1. In an air treating system for an enclosure to improve environmental conditions therein comprising:
   (a) air conditioning means,
   (b) an apparatus comprising; a reservoir connected to a source of water supply and a chemical dispenser for providing chemically treated water in said reservoir,
   (c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
   (d) a first conduit connecting the said water sealed compressor to a separator which receives and separates the said exhausted chemically treated water from the said treated air,
   (e) a second conduit connecting said separator to a dehumidifying chamber provided with a fluid coil connected with respect to said air conditioning means whereby the said treated air is subjected to dehumidification, and
   (f) conduit means for passing said treated air which has been exposed to dehumidification to said enclosure.

2. In an air treating system for an enclosure to improve environmental condition therein according to claim 1 wherein the said chemical is permanganate.

3. In an air treating system for an enclosure to improve environmental conditions therein comprising:
   (a) air conditioning means,
   (b) an apparatus comprising: a reservoir connected to a source of water supply and a chemical dispenser for providing chemically treated water in said reservoir,
   (c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
   (d) a first conduit connecting the said water sealed compressor to a separator which receives and separates the said exhausted chemically treated water from the said treated air,
   (e) a second pipe interconnecting said separator and said reservoir whereby the said chemically treated water in said separator is returned to said reservoir for re-use,
   (f) a second conduit connecting said separator to a dehumidifying chamber provided with a fluid coil connected with respect to said air conditioning means whereby the said treated air is subjected to dehumidification, and
   (g) conduit means for passing said treated air which has been exposed to dehumidification to said enclosure.

4. In an air treating system for an enclosure to improve environmental conditions therein comprising:
   (a) air conditioning means,
   (b) an apparatus comprising: a reservoir connected to a source of water supply and a chemical dispenser for providing chemically treated water in said reservoir,
   (c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
   (d) a first conduit connecting the said water sealed compressor to a separator which receives and separates the said exhausted chemically treated water from said treated air,
   (e) a second pipe interconnecting said separator and said reservoir whereby the said chemically treated water in said separator is returned to said reservoir for re-use,
   (f) a second conduit connecting said separator to a dehumidifying chamber provided with a fluid coil connected with respect to said air conditioning means whereby the said treated air is subjected to dehumidification,
   (g) conduit means for passing said treated air which has been exposed to dehumidification to said enclosure, and
   (h) means for exhausting said air from said enclosure to thereby provide for a change of air.

5. In an air treating system for an enclosure chamber to improve environmental conditions therein comprising:
   (a) air conditioning means,
   (b) an apparatus comprising: a reservoir connected to a source of water supply and a chemical dispenser for providing chemically treated water in said reservoir,
   (c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
(d) a first conduit connecting the said water sealed compressor to a separator which receives and separates the said exhausted chemically treated water from the said treated air,
(e) a second pipe interconnecting said separator and said reservoir whereby the said chemically treated water in said separator is returned to said reservoir for re-use,
(f) a second conduit connecting said separator to a dehumidifying chamber provided with a first fluid coil connected with respect to said air conditioning means whereby the said treated air is subjected to dehumidification,
(g) a condenser provided with a second fluid coil connected with respect to said air conditioning means,
(h) a third pipe connected to said first pipe and to one end of said second fluid coil,
(i) a fourth pipe connected to the other end of said second fluid coil and to said second pipe,
(j) a pump connected to said first pipe whereby water from said reservoir is delievered to said water sealed compressor and also pumped through said second fluid coil which is returned to said reservoir,
(k) a first control valve connected to said first pipe and a second control valve connected to said third pipe whereby the volume of water delivered to said condenser and said water sealed compressor is controlled, and
(l) conduit means for passing said treated air which has been exposed to dehumidification to said enclosure.

6. In an air treating system for a hyperbaric chamber to improve environmental conditions therein comprising:
(a) air conditioning means,
(b) an apparatus comprising: a reservoir connected to a source of water supply and a chemical dispenser for providing chemically treated water in said reservoir,
(c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
(d) a first conduit connecting the said water sealed compressor to a separator which receives and separates the said exhausted chemically treated water from said treated air,
(e) a second pipe interconnecting said separator and said reservoir whereby the said chemically treated water in said separator is returned to said reservoir for re-use,
(f) a second conduit connecting said separator to a dehumidifying chamber provided with a first fluid coil connected with respect to said air conditioning means whereby the said treated air is subjected to dehumidification,
(g) a condenser provided with a second fluid coil connected with respect to said air conditioning means,
(h) a third pipe connected to said first pipe and to one end of said second fluid coil,
(i) a fourth pipe connected to the other end of said second fluid coil and to said second pipe,
(j) a pump connected to said first pipe whereby water from said reservoir is delievered to said water sealed compressor and also pumped through said second fluid coil which is returned to said reservoir,
(k) a first control valve connected to said first pipe and a second control valve connected to said third pipe whereby the volume of water delivered to said condenser and said water sealed compressor is controlled, and
(l) conduit means for passing said treated air which has been exposed to dehumidification to said hyperbaric chamber.

7. In an air treating system for a hyperbaric chamber to improve environmental conditions therein comprising:
(a) air conditioning means,
(b) an apparatus comprising: a reservoir connected to a source of water supply and a chemical dispenser for providing chemically treated water in said reservoir,
(c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
(d) a first conduit connecting the said water sealed compressor to a separator which receives and separates the said exhausted chemically treated water from the said treated air,
(e) a second conduit connecting said separator to a dehumidifying chamber provided with a fluid coil connected with respect to said air conditioning means whereby the said treated air is subjected to dehumidification, and
(f) conduit means for passing said treated air which has been exposed to dehumidification to said hyperbaric chamber.

8. In an air treating system for a hyperbaric chamber to improve environmental conditions therein according to claim 7 wherein the said chemical is permanganate.

9. In an air treating system for a hyperbaric chamber to improve environmental conditions therein comprising:
(a) air conditioning means,
(b) an apparatus comprising: a reservoir connected to a source of water supply and a chemical dispenser for providing chemically treated water in said reservoir,
(c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water,
(d) a first conduit connecting the said water sealed compressor to a separator which receives and separates the said exhausted chemically treated water from the said treated air,
(e) a second pipe interconnecting said separator and said reservoir whereby the said chemically treated water in said separator is returned to said reservoir for re-use,
(f) a second conduit connecting said separator to a dehumidifying chamber provided with a fluid coil connected with respect to said air conditioning means whereby the said treated air is subjected to dehumidification, and
(g) conduit means for passing said treated air which has been exposed to dehumidification to said hyperbaric chamber.

10. In an air treating system for a hyperbaric chamber to improve environmental conditions therein comprising:
(a) air conditioning means,
(b) an apparatus comprising: a reservoir connected to a source of water supply and a chemical dispenser for providing chemically treated water in said reservoir,
(c) a water sealed compressor having an air intake port and a water intake port connected to said reservoir below the water level therein by a first pipe and to ambient air respectively, whereby air and chemically treated water are exhaused therefrom, the said air thereby having been subjected to purification treatment through its contact with said chemically treated water, (d) a first conduit connecting the said water sealed compressor to a separator which receives and separates the said exhausted chemically treated water from the said treated air, (e) a second pipe interconnecting said separator and said reservoir whereby the said chemically treated water in said separator is returned to said reservoir for re-use, (f) a second conduit connecting said separator to dehumidifying chamber provided with a fluid coil connected with respect to said air conditioning means whereby the said treated air is subjected to dehumidification, (g) conduit means for passing said treated air which has been exposed to dehumidification to said hyperbaric chamber, and (h) means for exhausting said air from said enclosure to thereby provide for a change of air.

11. In an air treating system for a hyperbaric chamber environmental conditions therein comprising:

(a) air conditioning means, (b) an apparatus comprising: a reservoir connected to a source of water supply and a chemical dispenser for providing chemically treated water in said reservoir, (c) a water sealed compressor having an air intake port and a water intake port connected to said reservoir below the water level therein by a first pipe and to ambient air respectively, whereby air and chemically treated water are exhausted therefrom, the said air thereby having been subjected to purification treatment through its contact with said chemically treated water, (d) a first conduit connecting the said water sealed compressor to a separator which receives and separates the said exhausted chemically treated water from the said treated air, (e) a second conduit connecting said separator to a dehumidifying chamber provided with a fluid coil connected with respect to said air conditioning means whereby the said treated air is subjected to dehumidification, (f) conduit means for passing said treated air which has been exposed to dehumidification to said hyperbaric chamber, and (g) a third conduit, provided with a control valve, connected to said conduit means and with respect to said air intake port whereby means for controlling the pressure in said hyperbaric chamber is provided.

References Cited by the Examiner

UNITED STATES PATENTS

| | | | |
|---|---|---|---|
| 904,172 | 11/1908 | Batter | 62—78 |
| 1,466,652 | 8/1923 | Batter | 62—271 |
| 1,518,162 | 12/1924 | Parkinson | 62—271 |
| 1,827,530 | 10/1931 | LeGrand | 62—78 |
| 2,089,776 | 10/1937 | Wittmann | 62—271 |
| 2,477,021 | 7/1949 | Vingoe | 62—78 |
| 2,874,032 | 2/1959 | Kuehner | 23—267 |
| 2,952,993 | 9/1960 | Bosworth | 62—94 |

WILLIAM J. WYE, *Primary Examiner.*